Nov. 11, 1952     D. H. MONTGOMERY     2,617,177
HOLDER FOR CIRCULAR TOOLS
Filed Jan. 15, 1947
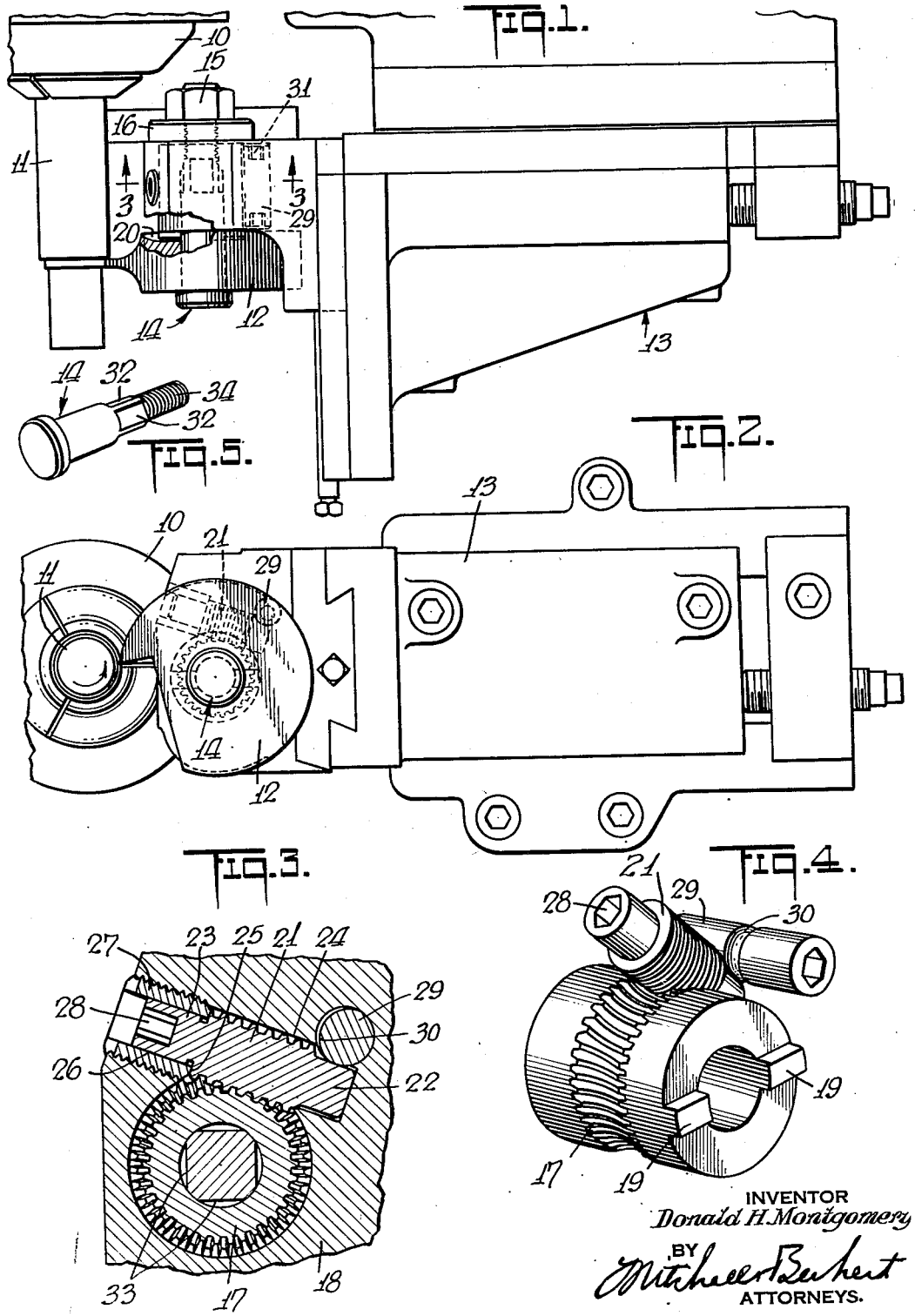
INVENTOR
Donald H. Montgomery
BY
Mitchell Berhert
ATTORNEYS.

Patented Nov. 11, 1952

2,617,177

UNITED STATES PATENT OFFICE 2,617,177

HOLDER FOR CIRCULAR TOOLS

Donald H. Montgomery, West Hartford, Conn., assignor to The New Britain Machine Company, New Britain, Conn., a corporation of Connecticut Application January 15, 1947, Serial No. 722,245

8 Claims. (Cl. 29—102)

My invention relates to tool holders and in particular to an improved means for adjustably positioning a circular tool.

In lathes or other spindle machines in which so-called circular tools are employed, it is usually difficult to set or to reset the tool in exactly the desired position. This difficulty is particularly noticeable after the tool has been removed for grinding and when the cutting edge has therefore been slightly displaced.

It is an object of my invention to provide an improved mounting for a circular tool, whereby setting-up and replacement time may be considerably reduced.

It is another object to provide an improved means for adjustably positioning a circular tool and for locking the same in its adjusted position.

Other objects and various further features of the invention will be pointed out or will occur to those skilled in the art from a reading of the following specification in conjunction with the accompanying drawings, in which:

Fig. 1 is a fragmentary plan view of a machine, in which my invention has been applied to the holder for a circular tool;

Fig. 2 is a side view of the arrangement of Fig. 1;

Fig. 3 is an enlarged fragmentary sectional view of parts of the arrangement of Fig. 1, taken substantially in the plane 3—3 of Fig. 1;

Fig. 4 is an enlarged perspective view illustrating the cooperation of parts of the arrangement of Fig. 1; and Fig. 5 is a view in perspective of one of the parts of Fig. 1.

Broadly speaking my invention contemplates means for adjustably securing a so-called circular tool in a given selected angular position of said tool. In the specific form to be described, the tool-carrying means includes a worm wheel or pinion journalled in the tool-holder base, and a worm (also journalled in the base) engages the pinion. The journalling for the worm is loose so as to permit radial play of the worm, and cam means, readily accessible for adjustment, is employed to wedge the worm against the pinion once a selected angular position of the tool has been accomplished.

Referring to the drawings, my invention is shown in application to a spindle machine including a spindle 10 supporting bar stock 11 to be formed by a circular forming tool 12. The forming tool 12 is supported upon a tool holder carried by a tool-slide 13, which may impart to the tool 12 displacement generally radially of the axis of the stock 11. The tool 12 may be supported upon the tool holder by means of an arbor member 14, which in cooperation with a take-up nut 15 and washer 16 may relatively firmly hold the tool to the work holder.

In accordance with the invention, I provide novel means for angularly positioning the tool 12 about the axis of its supporting arbor 14 and for clamping the same against subsequent angular displacement. In the form shown, this means includes a worm wheel or pinion member 17 journalled preferably on both sides of its teeth within a base member 18 forming part of the tool holder or slide 13. The pinion 17 is lockingly engageable with the circular tool 12, and this engagement may be effected by a pair of dogs or lugs 19 formed on one end of the pinion 17 and engageable with key slots 20, which may be milled out of the tool 12 if the tool 12 is relatively thick (as shown). If the tool 12 is relatively thin, it is clear that other clamping means (including say, longitudinally extending pin means) may be devised lockingly to engage the dogs 19, whereby the tool 12 is held angularly fast to the pinion 17.

In engagement with the pinion 17 is a worm 21 having on both sides of the worm teeth, stud portions 22—23 for journalled support within the base member 18. In the form shown, the worm 21 is receivable in a bore 24 within the base member 18, and the design of the stud portion 22 is such that this portion 22 has radial play with respect to the bore 24. Preferably, the end of the stud portion 22 abuts the bottom of the bore 24. In the form shown, the other stud portion 23 of the worm 21 is formed with a shoulder 25 and a cylindrical journal surface 26 of reduced diameter. To complete the journalling for the other stud portion 23, a bushing 27 may be threadedly inserted within the bore 24, the internal diameter of the bushing 27 slidably accommodating the stud portion 23.

It will be appreciated that the described fit of the worm 21 to the pinion 17 is relatively loose and that, therefore, rotating adjustment of the worm 21, as by use of a so-called Allen-head wrench fitting within the socket 28, may readily effect angular adjustment of the circular tool 12. Once a desired angular setting has been made, I employ means for clamping the relatively loose end of the worm 21, whereby the worm 21 and the pinion 17 are squeezed or wedged together. In the form shown, this clamping action results from rotation of a cam member 29 journalled in the base member 18 and having a camming or eccentric surface 30, for depressing or releasing the stud end portion 22, as the case may be. Adjustment of the cam member 29 may be made by employment of a suitable wrench fitting in the socket 31 (see Fig. 1) at the back end of the cam member 29.

To promote further rigidity to the fit of the tool 12 upon the tool holder or base member 18, the bolt or arbor 14 may be locked to the pinion wheel 17. In the form shown, the locking engagement is effected by a plurality of flats 32 milled centrally on the arbor 14 and fitting within a suitably broached central section 33 of the pinion 17. In accordance with conventional practice, the back end of the arbor 14 is provided with a threaded shank 34 to accommodate the take-up nut 15.

It will be appreciated that, once the cam member 29 has been tightened against the worm and pinion by the described adjustment means and that when the take-up nut 15 has been finally clamped, an extremely efficient and rigid assembly is produced so as to resist torsional strains derived from the cutting action of the tool 12. The positioning of the tool 12 will be maintained very effectively until it becomes necessary to grind the tool or to replace it with another. In either event a mere relaxation of the nut 15 is the only operation necessary, for the tool then becomes immediately removable. After a new or a newly ground tool has been placed onto the arbor 14, fine angular adjustment is made with a wrench in the socket 28 (with the cam 29 relaxed); the cam 29 may then be operated by the same wrench, and the nut 15 finally taken-up on the arbor 14.

While I have described my invention in detail for the preferred form shown, it will be understood that modifications may be made within the scope of the invention as defined in the claims which follow.

I claim:

1. In a holder for a circular tool, a base member, tool-supporting means including a pinion journalled in said base member, a worm in engagement with said pinion, means for journalling said worm in said base member at both ends of said worm, the journal at one of said ends providing for radial play of said end of said worm with respect to said base member, and cam means journalled in said base member and in engagement with said end of said worm for depressing said end toward said pinion.

2. In a holder for a circular tool, a base member, a tool-supporting member including a pinion journalled in said base member, a worm in engagement with said pinion and including stud portions at each end for the support of each end of said worm, said base member having a bore to receive said worm with the end of one of said stud portions abutting the bottom of said bore, there being radial clearance between said one stud portion and said bore, said other stud portion including a shoulder and a cylindrical surface of reduced section, and a bushing threadedly receivable in said bore, said other stud portion being journalled within said bushing and said bushing being advanced into abutment with said shoulder.

3. A tool holder according to claim 2, in which cam means are journalled in said base member for engagement with said one stud portion for wedging said worm means firmly against said pinion.

4. A tool holder according to claim 2, and including a circular tool with a cutting edge offset from the mounting axis thereof, said tool being locked against angular movement relatively to said pinion, the arrangement of said cutting edge being such that the cutting thrust sustained by said edge is in a direction tending to seat the end of said one stud portion of said worm firmly against the bottom of said bore.

5. In a tool holder, a base member having two eccentrically intersecting bores, tool-supporting means including a pinion in one of said bores, abutment means in the other of said bores, and a worm in said other bore and meshing with said pinion, said tool-supporting means including means to receive torsionally directed cutting-tool thrusts in a direction to force said worm into direct compressional abutment with said abutment means.

6. A tool holder according to claim 5, and including clamping means for clamping said worm in an adjusted position.

7. A tool holder according to claim 5, in which said worm is radially loose in said other bore, and including means forcing said worm generally radially toward said pinion to jam said worm and said pinion against relative movement.

8. A tool holder according to claim 5, in which the other of said bores is open at one end only, whereby the bottom of said other bore may provide said abutment means.

DONALD H. MONTGOMERY.

REFERENCES CITED

The following references are of record in the file of this patent:

UNITED STATES PATENTS

| Number | Name | Date |
|---|---|---|
| 810,238 | Waite | Jan. 16, 1906 |
| 954,049 | Quast | Apr. 5, 1910 |
| 1,143,450 | Showalter | June 15, 1915 |
| 1,418,983 | Smith | June 6, 1922 |
| 1,673,039 | Brown | June 12, 1928 |